Feb. 23, 1932.        J. W. ALBERS ET AL        1,846,538
FISH LURE
Filed Nov. 28, 1930
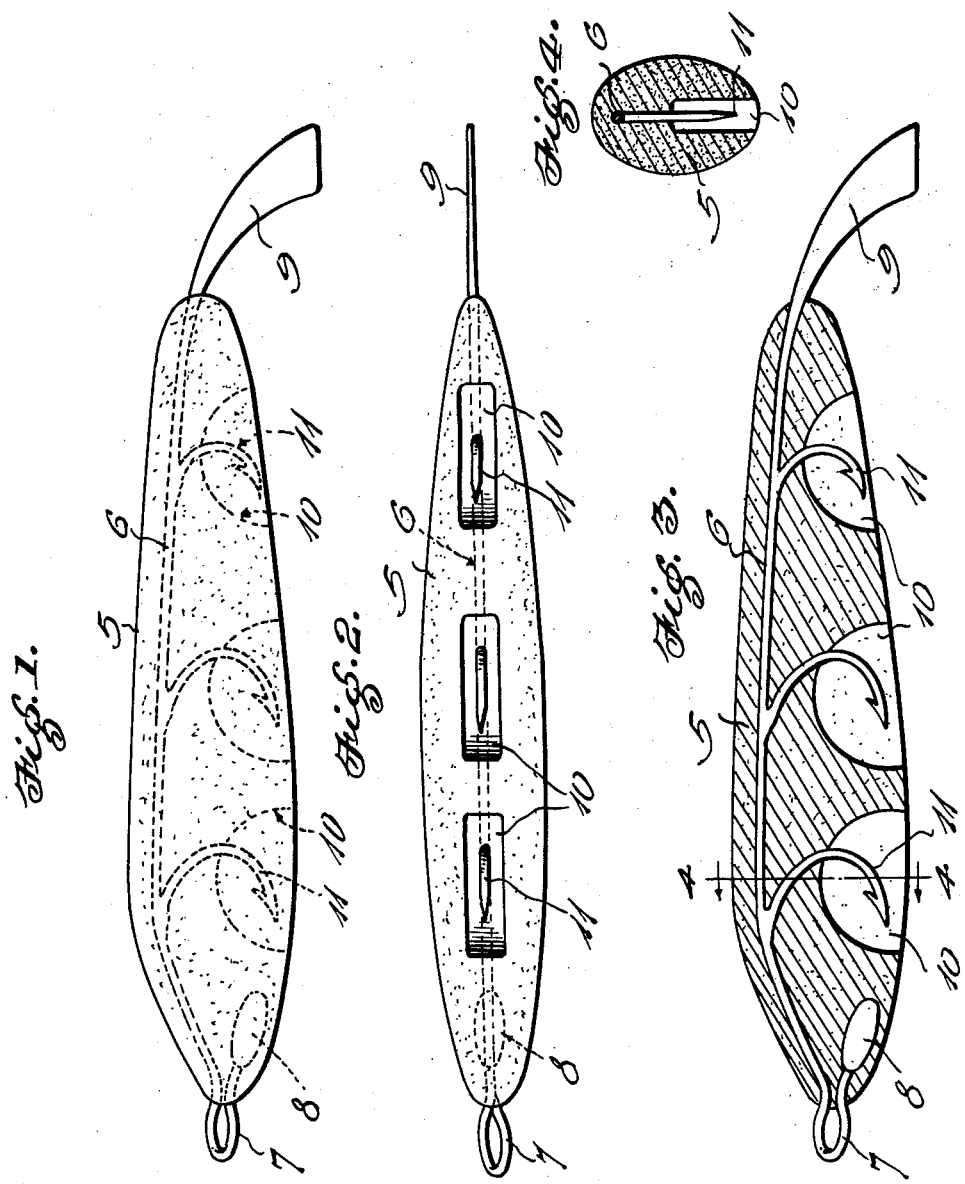
Inventors
John W. Albers
& Andrew J. Anderson
By Jerry A Mathews
Attorney Patented Feb. 23, 1932

1,846,538

UNITED STATES PATENT OFFICE

JOHN W. ALBERS, OF ANTIGO, AND ANDREW J. ANDERSON, OF WAUPACA, WISCONSIN

FISH LURE

Application filed November 28, 1930. Serial No. 498,836.

Our invention relates to improvements in fish lures.

In accordance with our invention, we provide a fish lure comprising a body portion formed of relatively soft and compressible, resilient material, and fish hook or hooks normally covered by such body portion and are exposed for engagement with the fish, when the body portion is compressed by the fish, as when the fish strikes or bites the lure. The lure is simple in construction, and cheap to manufacture.

In the accompanying drawings, forming a part of this specification, and in which like numerals are employed to designate like parts throughout the same, Figure 1 is a side elevation of a fish lure embodying our invention, Figure 2 is a bottom plan view of the same, Figure 3 is a central vertical longitudinal section through the same, and Figure 4 is a transverse section taken on line 4—4 of Figure 3.

In the drawings, wherein for the purpose of illustration, is shown a preferred embodiment of our invention, the numeral 5 designates the body portion of the lure, which is formed of a relatively compressible and resilient material, such as sponge rubber, rubber, or the like. This body portion may be formed of any suitable color, such as red.

Extending longitudinally through the body portion 5 is a rod 6, preferably formed of metal, which is embedded in the body portion and arranged in a vertical plane, extending through the central, longitudinal axis of the body portion. At its forward end, the rod 6 is bent into a loop, or eye, 7, extending forwardly beyond the body portion for attachment to a line, and a weight 8 is attached to the free end of the loop and is embedded in the forward end of the body portion. The weight is arranged beneath the central longitudinal axis of the body portion and serves as a ballast. At its rear end the rod 6 carries a flattened extension or appendage 9, serving as a ballast and also as a rudder to aid in the proper travel of the lure. This appendage may be formed of metal, and may be made integral with the longitudinal rod 6, but, if desired, may be formed of other material, such as celluloid, or the like. The appendage also serves as a lure element, and may be of any desired color.

The body portion 5 is preferably, provided upon its lower side, or bottom, with recesses 10, receiving and normally covering forwardly facing fish hooks 11, rigidly attached to the rod 6.

In the use of the lure, the loop or eye 7 is secured to the usual line, and the lure is drawn through the water in the usual manner. When the fish strikes or bites the body portion 5, of the lure, it is compressed, uncovering or exposing the hook, which engages the fish.

It is to be understood that the form of our invention, herewith shown and described, is to be taken as a preferred example of the same, and that various changes in the shape, size and arrangement of parts, may be resorted to without departing from the spirit of our invention or the scope of the subjoined claims.

Having thus described our invention, what we claim is:

1. A fish lure comprising a body portion formed of sponge rubber and provided in its bottom with a longitudinal set of recesses, a rod embedded within said body portion and extending longitudinally thereof and having its forward end bent into a loop, a weight secured to the free end of the loop and embedded within said body portion, fish hooks rigidly attached to the rod and arranged within the recesses so that they are normally covered by the body portion, and a flat appendage arranged at the rear of the body portion and secured to said rod.

2. A fish lure comprising a body portion formed of sponge rubber and provided with a longitudinal set of recesses, a relatively rigid rod extending longitudinally of the body portion and embedded therein, the forward end of the rod extending beyond the body portion and bent to provide an attaching loop, a flat appendage disposed at the rear of the body portion and secured to the rod, and a plurality of fish hooks secured to the rod and arranged within said recesses so that the body portion normally covers the hooks.

3. A fish lure comprising a body portion formed of sponge rubber and provided with a recess extending through the side thereof, a rod embedded within the body portion and extending longitudinally thereof and having its forward end bent into a loop, a weight secured to the free end of the loop and embedded within the body portion, and a fish hook attached to the rod and arranged within said recess so that the body portion normally covers the fish hook.

In testimony whereof we affix our signatures.

JOHN W. ALBERS.
ANDREW J. ANDERSON.